Sept. 16, 1924.
C. W. CALDWELL
1,508,596
MICROMETER WEIGHING INSTRUMENT
Filed Nov. 19, 1923
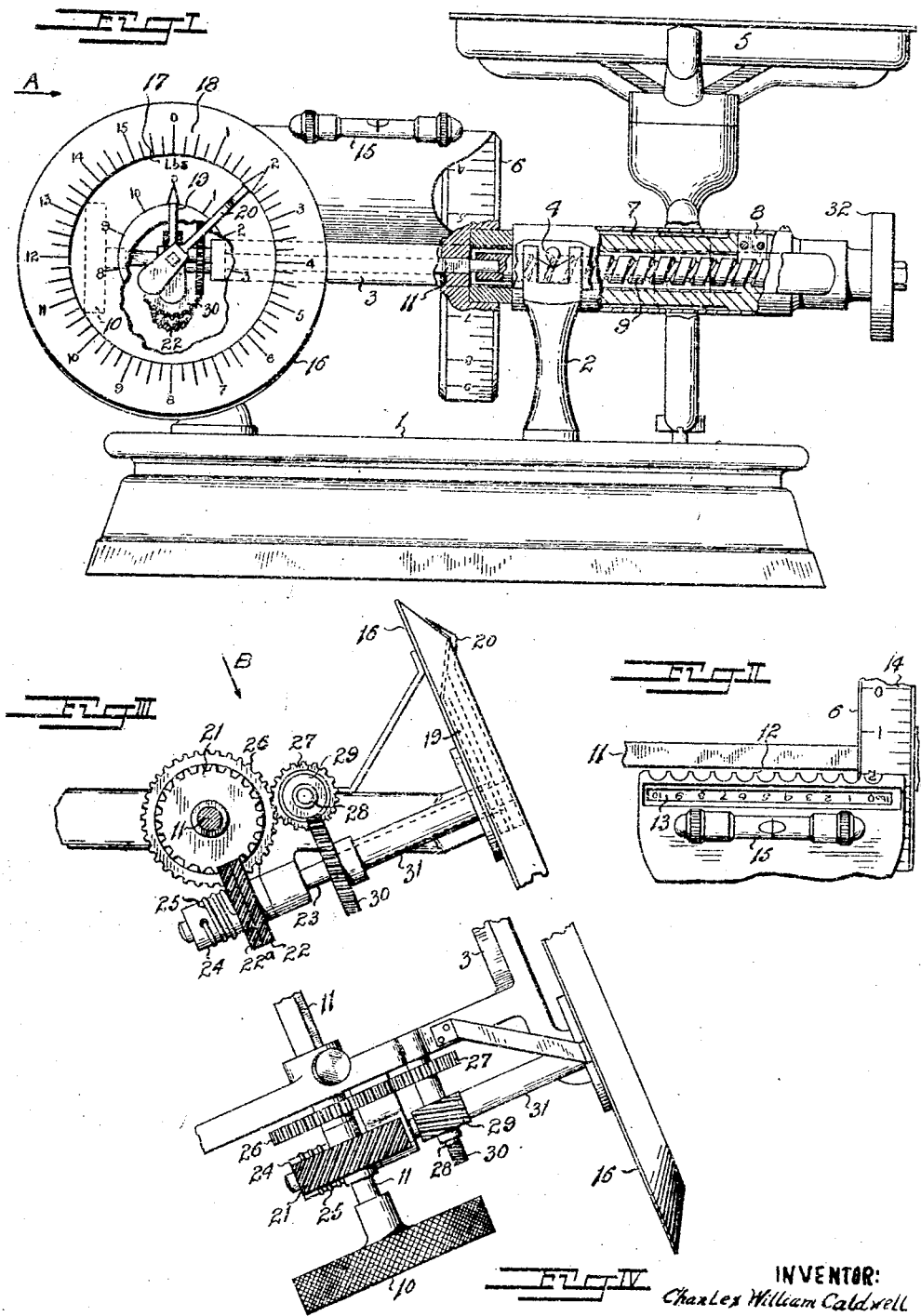
INVENTOR:
Charles William Caldwell
By Richards & Geier
Attys.

Patented Sept. 16, 1924.

1,508,596

UNITED STATES PATENT OFFICE.

CHARLES WILLIAM CALDWELL, OF JOHANNESBURG, TRANSVAAL, SOUTH AFRICA.

MICROMETER WEIGHING INSTRUMENT.

Application filed November 19, 1923. Serial No. 675,654.

*To all whom it may concern:*

Be it known that CHARLES WILLIAM CALDWELL, a British subject, residing at 53 O'Reilly Road, Berea, Johannesburg, Transvaal Province, Union of South Africa, has invented certain new and useful Improvements in Micrometer Weighing Instruments, of which the following is a specification.

The present invention has reference to weighing instruments of the kind in which a pivoted beam is provided with a poise movable along the beam by means of a so-called "micrometer" screw actuated by hand.

As such instruments are at present commonly constructed the weight in pounds is indicated by the position of the poise in relation to a scale arranged longitudinally on the beam; whilst ounces are indicated by an ounce scale marked on the periphery of the poise.

The present invention consists in a micrometer weighing instrument having improved means whereby the weight of the goods is clearly exhibited for view by the purchaser.

Fig. I is a view of the weighing instrument seen from the purchaser's side and partly sectioned.

Fig. II is a plan of the usual pound scale and part of the periphery of the poise.

Fig. III is an enlarged partial end view taken from the direction of the arrow A, Fig. 1, the hand wheel 10 being removed.

Fig. IV is a plan of Fig. 3 seen from the direction of the arrow B.

1 is the base of the instrument on which is erected a pillar 2. The beam 3 is pivoted on the pillar 2 at 4. 5 is the pan for receiving the goods.

The poise 6 is positioned on the side of pivot 4 opposite from the pan 5. It is fixed to a hollow shaft 7, mounted in the beam to be capable of sliding and rotating. By means of a nut member 8 said shaft 7 engages the micrometer screw 9. The latter is fixed to the beam 3. The poise 6 with the hollow shaft 7 is rotated by means of the hand wheel 10 and square shaft 11 which enters a square hole in the poise; the result being that as the handwheel 10 is turned, the poise is both rotated and traversed along the beam.

The weight of the goods in the pan 5 is ordinarily indicated, as appears from Fig. 2, by the position of the poise 6 in relation to the indented edge 12 of the pound scale 13 which is fixed to the beam; and by transverse ounce divisions 14, on the rim of the poise, which register with the edge of the scale 13. A spirit level 15 shows when the beam is in balance.

According to the present invention, the weight of the goods is indicated to the purchaser by means of a dial 16 fixed to the outer end of the beam 3 and bearing a pound scale 17 and an ounce scale 18; with which scales co-operate the counter-weighted and pivoted hands 19 and 20 respectively.

On the shaft 11 is fixed a skew gear wheel 21 which drives the equal skew gear wheel 22, 22$^a$. The latter is rigidly secured to the spindle 23 which extends transversely to the shaft 11 and on which the ounce hand 20 is mounted, so that said ounce hand makes one revolution for every revolution of the poise 6.

In order to overcome backlash in this gearing and thereby ensure very positive ounce measurements by the hand 20, the skewgear wheel 22, 22$^a$ is divided into two parts 22 and 22$^a$. The latter is capable of rotation on the boss 24 of part 22 and is fitted with a coil spring 25 which tends to rotate it relatively to the fixed part 22. This ensures that the teeth of the combined wheel 22, 22$^a$ always engage both faces of the teeth of the wheel 21, thus preventing lost motion.

On the handwheel shaft 11 is also rigidly fixed a gear wheel 26 driving a second gear wheel 27 rotatively mounted on the stud 28 projected from the beam. Rigid with the second gear wheel 27 is a worm 29 driving a worm wheel 30. The latter is rigid with a hollow spindle 31 which surrounds the spindle 23 and which carries the pound hand 19.

The ratio of the gear train 26, 27, 29, 30 is in the example shown sixteen to one so that the pound hand 19 moves through one pound division on the scale 17 for every revolution of the poise 6 and the ounce hand 20.

The dial 16, with its hands and hand actuating mechanism is counter balanced by means of an added weight 32.

The mechanism described for exhibiting the weight to the purchaser may be employed with or without the usual means for indicating the weight constituted by the scale 13 and the divisions on the periphery of the poise 6.

I claim:—

1. In a micrometer scale, the combination of a pivoted beam, a rotatable poise movable along the beam, a dial on the beam, counterweighted hands pivoted to rotate over the dial, a non-traversible shaft rotatably mounted on the beam for operating the poise, a hand wheel for rotating said shaft, gear wheels on said shaft, and gear trains operating the dial hands from said shaft, said gear trains having different velocity ratios whereby the hands are rotated at different angular speeds.

2. In a micrometer scale, the combination of a pivoted beam, a rotatable poise movable along the beam, a shaft for operating the poise and extending beyond the end of the beam, a dial at the end of the beam, hands rotatable over the dial, rotatable spindles carrying the hands and extending transversely to the poise operating shaft and gearing carried outside the beam and operatively connecting the poise shaft to the separate hand-carrying spindles to rotate the same at different angular speeds.

3. In a micrometer scale, the combination of a pivoted beam, a rotatable poise movable along the beam, a shaft for rotating the poise, a dial on the beam, hands rotatable over the dial, a spindle extending transversely to the shaft and carrying a hand, a hollow spindle surrounding the aforesaid spindle and carrying another hand, skew gears fixed to said shaft and said spindle respectively and operatively engaged with one another, a gear wheel on the shaft and reducing gear connecting said gear wheel to the hollow spindle to rotate the same at a less angular speed than the spindle.

4. In a micrometer scale the combination of a pivoted beam, a rotatable poise movable along the beam, a rotatable shaft for operating the poise, a hand wheel on the shaft, a dial on the beam, counterweighted hands rotatable over the dial, spindles for the hands sets of gearings severally connecting the poise operating shaft to said hand-carrying spindles to operate the hands at different angular speeds, the gearing for the hand with the higher angular speed including means for overcoming lost motion.

5. In a micrometer scale, the combination of a pivoted beam, a rotatable poise movable along the beam, a poise operating shaft rotatably mounted in the beam, a skew gear wheel on the said shaft, a dial on the beam, hands rotatable over the dial, hand spindles extending transversely to the beam, a skew gear wheel on one of said hand spindles and engaging the skew gear wheel on the poise operating shaft, one of said skew gear wheels being divided, spring means tending to move said divided parts of said skew gear wheel angularly with regard to one another, and a reducing gear train connecting the poise operating shaft with the other hand-carrying spindle.

6. In a micrometer scale, the combination of a pivoted beam, a rotatable poise movable along the beam, a shaft for rotating the poise, a dial on the beam, hands rotatable over the dial, spindles for the hands extending substantially perpendicularly to the shaft, a gear wheel on the shaft, an equal gear wheel on one of the hand-carrying spindles engaging the shaft gear wheel at right angles, another gear wheel on the shaft, and speed reducing gear connecting said other shaft gear wheel to another hand-carrying spindle.

In testimony whereof I hereunto affix my signature.

CHARLES WILLIAM CALDWELL.